UNITED STATES PATENT OFFICE.

JULIUS BUEB, OF DESSAU, GERMANY, ASSIGNOR TO THE ROESSLER & HASSLACHER CHEMICAL COMPANY, OF NEW YORK, N. Y., A CORPORATION OF NEW YORK.

PROCESS OF MAKING CYANID BRIQUETS.

No. 912,538.   Specification of Letters Patent.   Patented Feb. 16, 1909.

Application filed April 15, 1908. Serial No. 427,118.

*To all whom it may concern:*

Be it known that I, JULIUS BUEB, a subject of the German Empire, and a resident of Dessau, Germany, have invented a certain new and useful Improvement in the Process of Making Cyanid Briquets, of which the following is a specification.

This invention relates to a process of making cyanid briquets.

Up to the present time cyanid has been obtainable in briquet form only by first making cyanid crystals, then melting them and then while in a state of fusion pouring the mass into briquet molds.

By my new process the labor and expense of melting the cyanid crystals are eliminated, while briquets are produced which, while being substantially stone hard, are more easily dissolved by soluble agents than those briquets heretofore made by melting and molding.

In the following I have described one means of carrying out my new process, the features thereof being more fully pointed out hereinafter in the claims.

Cyanid crystals are formed in the usual manner and pressed into briquet form by any suitable means. This briquet immediately that it is removed from the briquet press is placed in a closed vessel in which a suitable vacuum is maintained. The vessel should be maintained at a heat, preferably not less than 70 degrees centigrade, for a period of several hours and until the water absorbed during the preliminary steps of making the briquet is evaporated. I have found that with a briquet of 0.5 kilos weight with a temperature of approximately 70 degrees centigrade two hours are sufficient for the evaporation. A briquet treated as described takes on a stonehard structure, resistant to both mechanical and atmospheric influences.

It is obvious that the process may be varied without departing from the spirit of the invention, and I do not restrict myself to any of the details of the process as described.

What I claim and desire to secure by Letters Patent of the United States is:

1. A process of making cyanid briquets consisting in forming cyanid crystals into briquets and subsequently heating the briquets to a degree sufficient only to drive off the water and not sufficient to decompose the cyanid.

2. A process of making cyanid briquets consisting in forming cyanid crystals into briquets and subsequently evaporating the moisture contained in the same by heating the briquets to a degree sufficient only to drive off the water and not sufficient to decompose the cyanid.

3. A process of making cyanid briquets consisting in forming cyanid crystals into briquets and subsequently heating the briquets in a vacuum to a degree sufficient only to drive off the water and not sufficient to decompose the cyanid.

4. A process of making cyanid briquets consisting in forming cyanid crystals into briquets and subsequently heating the briquets in a vacuum at a temperature of not less than approximately 70 degrees centigrade.

In witness whereof I have hereunto signed my name in the presence of two subscribing witnesses.

JULIUS BUEB.

Witnesses:
WOLDEMAR HAUPT,
HENRY HASPER.